US009940270B2

(12) United States Patent
Morales

(10) Patent No.: US 9,940,270 B2
(45) Date of Patent: Apr. 10, 2018

(54) MULTIPLE REQUEST NOTIFICATION NETWORK FOR GLOBAL ORDERING IN A COHERENT MESH INTERCONNECT

(71) Applicant: FREESCALE SEMICONDUCTOR, INC., Austin, TX (US)

(72) Inventor: Fernando A. Morales, Austin, TX (US)

(73) Assignee: NXP USA, Inc., Austin, TX (US)

( * ) Notice: Subject to any disclaimer, the term of this patent is extended or adjusted under 35 U.S.C. 154(b) by 145 days.

(21) Appl. No.: 14/838,601

(22) Filed: Aug. 28, 2015

(65) Prior Publication Data

US 2017/0060786 A1  Mar. 2, 2017

(51) Int. Cl.
  *G06F 13/16* (2006.01)
  *G06F 13/18* (2006.01)

(52) U.S. Cl.
  CPC ...... *G06F 13/1642* (2013.01); *G06F 13/1663* (2013.01); *G06F 13/18* (2013.01)

(58) Field of Classification Search
  None
  See application file for complete search history.

(56) References Cited

U.S. PATENT DOCUMENTS

| | | | | | |
|---|---|---|---|---|---|
| 4,663,706 | A | * | 5/1987 | Allen | G06F 15/17337 370/403 |
| 4,933,838 | A | * | 6/1990 | Elrod | G06F 11/2005 714/3 |
| 5,566,342 | A | * | 10/1996 | Denneau | G06F 15/17393 712/11 |
| 5,590,299 | A | * | 12/1996 | Bennett | G06F 13/18 711/157 |
| 5,598,408 | A | * | 1/1997 | Nickolls | G06F 15/17393 370/351 |
| 5,630,140 | A | * | 5/1997 | Modiri | G06F 9/542 710/200 |
| 6,263,415 | B1 | * | 7/2001 | Venkitakrishnan | G06F 15/17381 370/406 |
| 7,657,880 | B2 | * | 2/2010 | Wang | G06F 9/3842 711/213 |

(Continued)

OTHER PUBLICATIONS

A Cost-Effective Load-Balancing Policy for Tile-Based, Massive Multi-Core Packet Processors; by Enric Musoll; ACM 2010; See pp. 24:3 and 24:4.*

(Continued)

*Primary Examiner* — Reginald G Bragdon
*Assistant Examiner* — Paul M Knight

(57) ABSTRACT

A data processing system includes a plurality of processing unit. Each processing unit includes notification storage circuitry configured to store a notification indicator corresponding to each processing unit which indicates whether the processing unit has an outstanding coherent memory request, and multiple request storage circuitry configured to store a multiple request indicator corresponding to each processing unit which indicates whether the processing unit has more than one outstanding request. The data processing system also includes an interconnect network coupled between the processing units and configured to broadcast coherent memory requests from a requesting processing unit of the plurality of processing units to other processing units of the plurality of processing units.

12 Claims, 3 Drawing Sheets

(56) References Cited

U.S. PATENT DOCUMENTS

| | | | | |
|---|---|---|---|---|
| 7,937,257 B2* | 5/2011 | Arora | ................... | G06F 9/5016 703/20 |
| 8,015,567 B2* | 9/2011 | Hass | ..................... | H04L 49/15 370/258 |
| 8,112,581 B1* | 2/2012 | Agarwal | ............ | G06F 12/0811 711/112 |
| 8,826,064 B2* | 9/2014 | Boesen | ................... | G06F 8/31 714/10 |
| 2002/0024938 A1* | 2/2002 | Naik | ..................... | H04L 29/06 370/282 |
| 2002/0099976 A1* | 7/2002 | Sanders | ............. | G06F 11/2007 714/23 |
| 2003/0128709 A1* | 7/2003 | Venkitakrishnan | .. | H04Q 3/5455 370/400 |
| 2006/0085582 A1* | 4/2006 | Shikano | ................. | G06F 13/24 710/260 |
| 2008/0294874 A1* | 11/2008 | Honary | .............. | G06F 17/5045 712/29 |
| 2009/0168767 A1* | 7/2009 | Anders | ............ | G06F 15/17375 370/355 |
| 2011/0107065 A1* | 5/2011 | Ikonomopoulos | .. | G06F 13/4022 712/220 |
| 2012/0008631 A1* | 1/2012 | Hass | ..................... | H04L 49/30 370/394 |
| 2013/0160028 A1* | 6/2013 | Black | ................ | G06F 15/17325 719/314 |

OTHER PUBLICATIONS

Daya et al, "SCORPIO: A 36-core research chip demonstrating snoopy coherence on a scalable mesh NoC with in-network ordering", ACM/IEEE 41st International Symposium on Computer Architecture (ISCA), Jun. 14-18, 2014, pp. 25-36.

Subramanian, "Ordered Mesh Network Interconnect (OMNI): Design and Implementation of In-Network Coherence", Submitted to the Department of Electrical Engineering and Computer Science at the Massachusetts Institute of Technology, Jun. 2013, pp. 1-104.

* cited by examiner

US 9,940,270 B2

MULTIPLE REQUEST NOTIFICATION NETWORK FOR GLOBAL ORDERING IN A COHERENT MESH INTERCONNECT

BACKGROUND

Field

This disclosure relates generally to coherent mesh interconnect networks, and more specifically, to a multiple request notification network for global ordering in a coherent mesh interconnect.

Related Art

Certain computing fabrics may take the form of a plurality of interconnected nodes. A node may include a processor, processing core, memory management unit, peripheral management unit, or some other component that may generate or receive a request for data stored in a memory location. In some configurations, the interconnected nodes may also take advantage of a shared memory (or collection of memories). In order to ensure that the data stored in the shared memory remains coherent, systems and methods may be needed to manage the order by which memory requests are processed by a node.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system having a plurality of interconnected nodes, in which each node of a plurality of the nodes is capable of generating or processing coherent memory requests, it is desirable to achieve a global ordering in order to maintain coherency of a shared memory or collection of memories. While systems have been able to do so with a notification network between the nodes when a coherent memory request has been made by a node, it is possible that a single node can broadcast multiple requests which are to be snooped by other nodes in the data processing system. In this case, the notification networks in existence today do not allow for the request notification of multiple coherent memory requests from a requester node. Only one request notification per requester node can be issued per notification window. Therefore, in one embodiment, a multiple request count network and multiple request network is used in conjunction with a notification network within the data processing system to allow for the notification of multiple requests from one requester node and at least one request from any other node per notification window.

Figure 1:
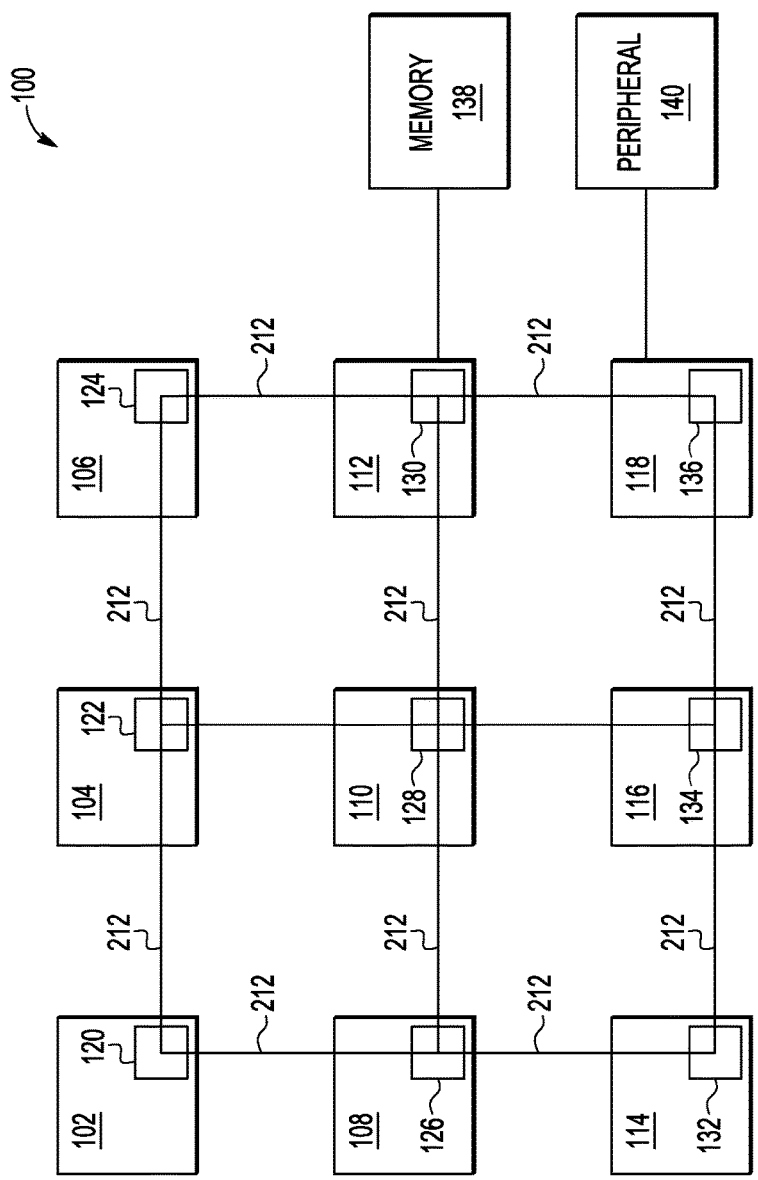
FIG. 1 illustrates, in block diagram form, a data processing system 100 in accordance with one embodiment of the present invention.

FIG. 1 illustrates, in block diagram form, a data processing system 100 having a plurality of interconnected nodes 102, 104, 106, 108, 110,112, 114, 116, and 118, a memory 138, and a peripheral 140. Each of the nodes are coupled to neighboring adjacent nodes by way of a plurality of interconnect networks 212. As will be described below, these networks may include a coherent memory request network, a notification network, a multiple request network, and a multiple request count network. Therefore, each network may include one or more conductors, depending on the number of bits needed within the network. For example, the notification network and multiple request network, as will be described below, may be a single bit network, and the multiple request count network may be an n-bit network, where n corresponds to an integer value of one or more needed to encode a count value. In the illustrated embodiment, the interconnected nodes are interconnected as a 3×3 array. However, in alternate embodiments, any type of interconnect formation may be used, such as any size array, or other forms of mesh interconnects such as a cross-bar switch, a ring interconnect, a point-to-point mesh fabric, a mesh with diagonal interconnects, etc.

Each node 102, 104, 106, 108, 110,112, 114, 116, and 118 may be referred to as a processing unit and may include any type of processing circuitry, such as, for example, a processor, a core processing unit, a memory management unit, a peripheral management unit, etc. Also, each node (i.e. processing unit) 102, 104, 106, 108, 110,112, 114, 116, and 118 includes corresponding switch-point circuitry 120, 122, 124, 126, 128, 130, 132, 134, and 136, respectively. The switch-point circuitry communicates information between the processing unit and the networks connected between the nodes. The switch-point circuitry of a processing unit also communicates information between two adjacent processing units. In this manner, information can be communicated between any two nodes in system 100 by traversing through switch-point circuitries of adjacent nodes. Furthermore, information from one node may be broadcasted to every node in system 100. In this case, note that nodes further away from the broadcasting node require more time to receive the information than nodes closer to the broadcasting node.

Memory 138 is coupled to node 112. Memory 138 can be a shared memory which can process memory requests from more than one node of system 100. The memory requests are communicated from the requesting node by way of the memory request network coupled between the nodes. In order to maintain coherency in system 100, those nodes which share memory 138 (e.g. snooper nodes) need to snoop memory requests made by other nodes to memory 138. This ensures that a node uses the most up to date information in memory 138. Therefore, as used herein, a coherent memory request refers to an access request (e.g. a read or write request) to a shared memory. Peripheral 140 is coupled to node 118 in which any node in system 100 can communicate with peripheral 140 through the interconnect network. Peripheral 140 may be any type of peripheral. Note that system 100 may include any number of memories, any of which may be shared by multiple nodes, and any number of peripherals. Also, memory 138 and peripheral 140 may also be considered nodes of system 100.

Figure 2:
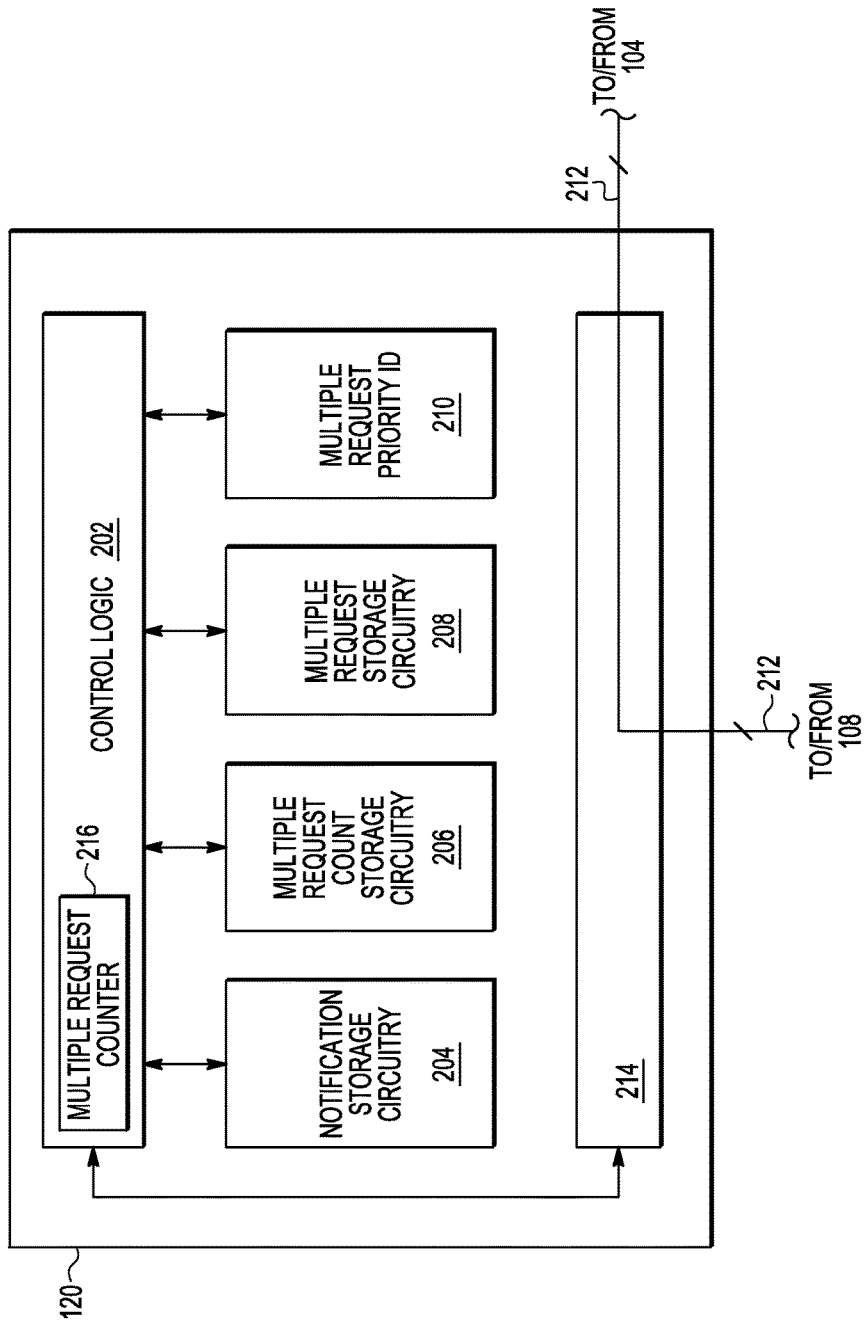
FIG. 2 illustrates, in block diagram form, switch-point circuitry within a processing unit of data processing system 100, in accordance with one embodiment of the present invention.

FIG. 2 illustrates, in block diagram form, switch-point circuitry 120 within processing unit 102, in accordance with one embodiment of the present invention. Circuitry 120 includes control logic 202, interconnect logic 214, notification storage circuitry 204, multiple request count storage circuitry 206, multiple request storage circuitry 208, and multiple request priority identifier (ID) circuitry 210. Control logic 202 includes a multiple request counter 216. Control logic 202 is bidirectionally coupled to each of interconnect logic 214, notification storage circuitry 204, multiple request count storage circuitry 206, multiple request storage circuitry 208, and multiple request priority identifier (ID) circuitry 210. Interconnect logic 214 is coupled to each network within interconnect networks 212. Interconnect logic 214 receives information from the networks within interconnect networks 212 and provides the information to control logic 202, and provides information from control logic 202 to networks 212.

In one embodiment, notification storage circuitry 204 includes one notification indicator field for each processing unit within system 100. Each notification indicator field stores a notification indicator for the corresponding processing unit which, when set (e.g. asserted), indicates that the corresponding processing unit has broadcast at least one outstanding coherent memory request. The broadcast can be to all nodes of system 100, to snooper nodes of system 100 (i.e. those nodes which need to snoop requests to maintain coherency), or to memory nodes of system 100. In one embodiment, multiple request storage circuitry 208 includes one multiple request indicator field for each processing unit within system 100. Each multiple request indicator field stores a multiple request indicator for the corresponding processing unit which, when set (e.g. asserted), indicates that the corresponding processing unit has more than one outstanding coherent memory request. Multiple request priority ID 210 identifies which of the processing units which have more than one outstanding request is the priority processing unit. Multiple request count storage circuitry 206 stores a count value of the number of outstanding requests which the priority processing unit has. Multiple request counter 216 keeps track of the number of remaining coherent memory requests processing unit 102 has pending but yet to broadcast.

In one embodiment, each of the notification indicators and the multiple request indicators is a single bit, and therefore, notification storage circuitry 204 and multiple request storage circuitry 208 may be referred to as a notification vector and a multiple request vector, respectively. In an alternate embodiment, each multiple request indicator in multiple request storage circuitry 208 may be a multi-bit field which includes an indicator or actual count of how many outstanding requests the corresponding processing unit has pending. In this case, multiple request count storage circuitry 206 may not be included within the processing units.

In operation, control logic 202 communicates with the processing elements of processing unit 102 which provides memory requests to the coherent memory request network of networks 212 to be communicated to a shared memory of system 100, such as memory 138. Control logic 202 updates information in notification storage circuitry 204, multiple request count storage circuitry 206, multiple request storage circuitry 208, and multiple request priority ID 210, as needed, and updates multiple request counter 216 as needed. Control logic 202 also broadcasts information, such as notification indicators, multiple request indicators, multiple request counts, as needed, to the other processing units by way of networks 212. Operation of switch-point circuitry 120 in processing unit 102 will be described in more detail in reference to FIG. 3. Also, note that the descriptions for processing unit 102 (including switch-point circuitry 120) can apply to any processing unit within system 100.

Figure 3:
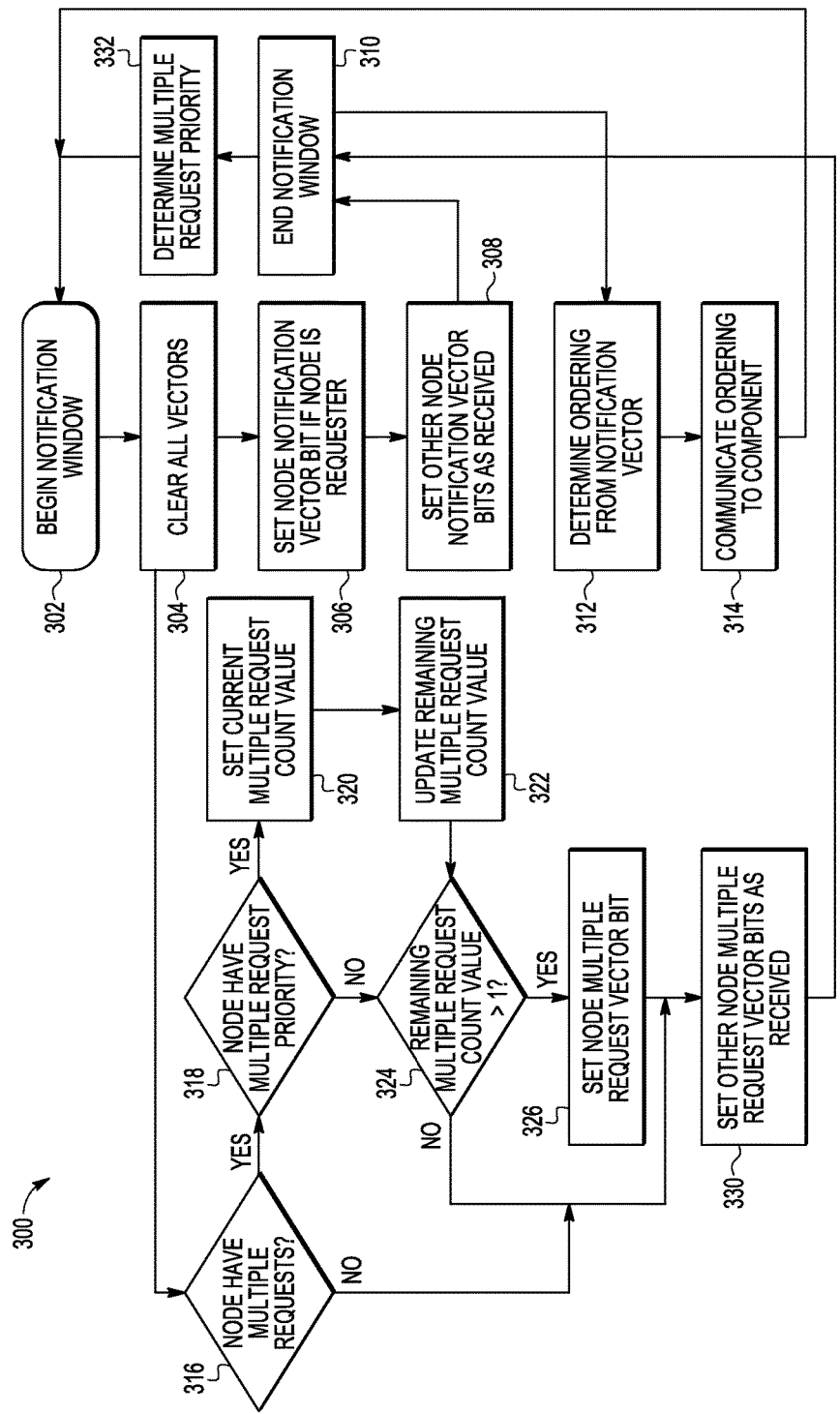
FIG. 3 illustrates, in flow diagram form, a method of operation of the switch-point circuitry of FIG. 2, in accordance with one embodiment of the present invention.

FIG. 3 illustrates, in flow diagram form, a method 300 of operation of switch-point circuitry 120 of FIG. 2, in accordance with one embodiment of the present invention. Method 300 begins with block 302 which begins or initiates a notification window. The notification window corresponds to a duration of time sufficient for information from a processing unit to propagate to all other processing units by way of networks 212. Method 300 proceeds to block 304 in which all vectors are cleared. That is, the indicators in notification storage circuitry 204 and multiple request storage circuitry 208 are cleared (e.g. negated). Method 300 proceeds to decision diamond 316 and to block 306. The operations beginning with decision diamond 316 until the end of the notification window at block 310 and the operations beginning with block 306 until the end of the notification window at block 310 may occur simultaneously (i.e. in parallel).

Beginning with decision diamond 316, it is determined, such as by control logic 202, whether node 102 has multiple outstanding coherent memory requests pending. If so, method 300 proceeds to decision diamond 318 in which it is determined whether node 102 has multiple request priority. That is, if node 102 is identified as the priority node (e.g. priority processing unit) by multiple request priority ID 210, it is considered the multiple request priority node. The multiple request priority node is determined by each node, such as by control logic 202, based on a same algorithm using the multiple request indicators of multiple request storage circuitry 208. The multiple request priority node is determined during a previous notification window and is stored in multiple request priority ID 210 for use in the current notification window. Further details will be provided with respect to block 332 below.

At decision diamond 318, if node 102 is determined to have multiple request priority, method 300 proceeds to block 320 in which node 102 sets the current multiple request count value which is stored in multiple request count storage circuitry 206. Control logic 202 keeps track of remaining outstanding memory requests by node 102 (which have not yet had notification indicators broadcast on the notification network) with multiple request counter 216. If node 102 is the multiple request priority node, control logic 202 uses multiple request counter 216 to set the multiple request count value. The multiple request count value corresponds to the number of previously broadcasted memory requests which are being notified by node 102 during a notification window. In one embodiment, there is a maximum number of memory requests that can be notified by a node (such as node 102) on the notification network per notification window. If the count value of multiple request counter 216 is less than or equal to the maximum allowable value, control logic 202 sets the current multiple request count value in multiple request count storage circuitry 206 to the value of multiple request counter 216, and updates the remaining multiple count value (in block 322) by clearing multiple request counter 216. If the count value of multiple request counter 216 is greater than the maximum allowable value, control logic 202 sets the current multiple request count value in multiple request storage circuitry 208 to the maximum allowable value, and updates the remaining multiple count value (in block 322) by decrementing the count value by the maximum allowable value.

In one embodiment, the maximum allowable value of memory requests that can be notified is programmable, such as within storage circuitry of control logic 202, or dynamically determined, such as by control logic 202. Also, while the number of memory requests that can be notified on the notification network may be limited, note that any number of memory requests can be broadcast at any time on the coherent memory request network, depending on resources available for handling the memory request.

Upon setting the current multiple request count value in multiple request count storage circuitry 206, control logic 202 broadcasts the count value to the other nodes by providing the count value to the multiple request count network. In this manner, each of the other nodes can receive the count value of the priority node and store the count value in the multiple request count storage circuitry of the node. Similarly, if node 102 is not the priority node, node 102 will receive, by way of the multiple request count network, the count value from the node which is the priority node and this received count value will be stored by control logic 202 in multiple count storage circuitry 206.

If, at decision diamond 318, node 102 does not have multiple request priority, or after block 322 if node 102 has multiple request priority, method 300 proceeds to decision diamond 324 where it is determined whether the remaining multiple request count value (as provided by multiple request counter 216, is greater than 1 (indicating that node 102 still has more than one outstanding memory request), then the multiple request indicator in multiple request indicator storage circuitry 208 corresponding to node 102 is set. If the remaining multiple request count value is not greater than 1, then the multiple request indicator corresponding to node 102 remains cleared. Method 300 then proceeds to block 330 in which other multiple request indicators within multiple request storage circuitry 208 are set as multiple request indicators are received by way of the multiple request network from other nodes. This continues until the notification window ends at block 310.

Note that when control logic 202 sets the multiple request indicator for node 102 if the remaining multiple request count value is greater than 1, control logic 202 broadcasts the set (i.e. asserted) multiple request indicator for node 102 to the other nodes by providing the multiple request indicator to the multiple request network of networks 212 via interconnect logic 214. Similarly, the control logic of other nodes are doing the same. As these broadcast multiple request indicators are received by way of the multiple request network from other nodes, control logic 202 updates the corresponding multiple request indicators corresponding to other nodes within multiple request storage circuitry 208. In one example, control logic 202 performs a bit-wise OR of received multiple request indicators corresponding to a same node of the plurality of nodes and updates the multiple request indicator in multiple request storage circuitry 208 for the same node accordingly. In this manner, if at least one multiple request indicator is received from a same node during the current notification window, the corresponding multiple request indicator in multiple request indicator storage circuitry 208 is set (i.e. asserted).

Referring back to block 304, after the vectors are cleared at the start of the notification window, method 300 also proceeds with block 306 in which the notification indicator of node 102 in notification storage circuitry 204 is set (i.e. asserted) by control logic 202 if node 102 has previously broadcast a memory request. Also, note that control logic 202 increments multiple request counter 216 by one each time node 102 broadcasts a memory request onto the coherent memory request network. Method 300 proceeds to block 308 in which other notification indicators within notification storage circuitry 204 are set as notification indicators are received by way of the notification network from other nodes. This continues until the notification window ends at block 310.

Note that when control logic 202 sets the notification indicator for node 102 in notification storage circuitry 204, control logic 202 broadcasts the set (i.e. asserted) notification indicator for node 102 to the other nodes by providing the notification indicator to the notification network of networks 212 via interconnect logic 214. Similarly, the control logic of other nodes are doing the same. (Note also that each time a notification indicator is broadcast on the notification network, the multiple request counter of the node is decremented by one.) As these broadcast notification indicators are received by way of the notification network from other nodes, control logic 202 updates the corresponding notification indicators corresponding to other nodes within notification storage circuitry 204. In one example, control logic 202 performs a bit-wise OR of received notification indicators corresponding to a same node of the plurality of nodes and updates the notification indicator in notification storage circuitry 204 for the same node accordingly. In this manner, if at least one notification indicator is received from a same node during the current notification window, the corresponding notification indicator in notification storage circuitry 204 is set (i.e. asserted).

After the notification window ends at block 310, method 300 proceeds to blocks 332 and blocks 312 and 314. Note that the operations in block 332 may be performed in parallel with operations in blocks 312 and 314. In block 332, the multiple request priority node is determined and an identifier of this priority node is stored in multiple request priority ID 210. As discussed above, the control logic in each node of system 100 applies a same algorithm to determine the multiple request priority ID using the multiple request indicators stored in the multiple request storage circuitry as a result of the previous notification window (which just ended). In this manner, note that each node will determine the same multiple request priority node and store an identifier of this priority node. Various different algorithms can be used by the nodes to determine the multiple request priority node. For example, the priority node can be determined using a round-robin algorithm so that each node with multiple outstanding requests gets selected in turn. Alternatively, a weighted round-robin algorithm may be used.

In block 312 after the end of the current notification window, an ordering of memory requests is determined by control logic 202 using the notification vector. Control logic 202 can determine the ordering of memory requests using the notification vector, and if at least one node has more than one outstanding request, using the multiple request priority identifier and the multiple request count value. Furthermore, the control logic in each unit of system 100 uses a same algorithm for determining the order in which to allow the requests, including the multiple requests from the priority unit. The control logic in each unit has access to the same information, such as the notification indicators in the notification storage circuitry and the multiple request count value which were communicated to all the nodes by the corresponding network and the multiple request priority ID which was determined with a same algorithm. In this manner, every unit in system 100 determines the same global ordering of requests to be processed. For example, if node 102 is the priority node and has 4 outstanding requests (as indicated by the multiple request count storage circuitry), control logic 202 may determine that the 4 outstanding requests of node 102 get ordered sequentially, without intervening requests, or may determine that the 4 outstanding requests of node 102 get ordered among other requests from other nodes, in which the 4 outstanding requests are interleaved among the other requests. The same ordering will also be determined by the control logic in the other nodes of system 100.

After block 312, method 300 proceeds to block 314 in which the global ordering is communicated by the control logic to the appropriate elements of the processing unit (i.e. of the node). Therefore, if the source ID of the next request to be processed indicates node 102, node 102 can proceed with processing the request.

Therefore, by now it can be understood how the use of multiple request indicators, communicated to nodes of a system by way of a multiple request network, and a multiple request count, communicated to nodes of the system by way of a multiple count network, in addition to the use of notification indicators communicated to nodes of the system by way of a notification network, may result in an improved global ordering of requests which allows for a node to have multiple requests processed during a particular window of time.

The conductors of the communication networks discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 100 are circuitry located on a single integrated circuit or within a same device. Alternatively, system 10 may include any number of separate integrated circuits or separate devices interconnected with each other. For example, memory 138 or peripheral 140 may be located on a same integrated circuit as the nodes or on a separate integrated circuit.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the nodes of system 100 may be interconnected with a variety of different network configurations. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Below are additional embodiments of the present invention.

In one embodiment, a data processing system includes a plurality of processing units, each processing unit including notification storage circuitry configured to store a notification indicator corresponding to each processing unit which indicates whether the processing unit has an outstanding coherent memory request; and multiple request storage circuitry configured to store a multiple request indicator corresponding to each processing unit which indicates whether the processing unit has more than one outstanding request; and an interconnect network coupled between the processing units and configured to broadcast coherent memory requests from a requesting processing unit of the plurality of processing units to other processing units of the plurality of processing units. In one aspect, the data processing system further includes a notification network coupled between the processing units and configured to communicate the notification indicator between the processing units; a multiple request network coupled between the processing units and configured to communicate the multiple request indicator between the processing units. In a further aspect, control circuitry within each processing unit is configured to perform a bit-wise OR of received notification indicators corresponding to a same processing unit of the plurality of processing units and, in response to the bit-wise OR, update the notification storage circuitry. In yet a further aspect, control circuitry within each processing unit is configured to perform a bit-wise OR of received multiple request indicators corresponding to a same processing unit of the plurality of processing units and, in response to the bit-wise OR, update the multiple request storage circuitry. In another aspect, each notification indicator is a single bit and each multiple request indicator is a single bit. In another aspect, processing unit includes control logic configured to select a priority processing unit having multiple outstanding requests based on the multiple request indicators in the multiple request storage circuitry. In a further aspect, each processing unit includes multiple request count storage circuitry configured to store a count of outstanding requests corresponding to the priority processing unit. In yet a further aspect, the data processing system further includes a multiple request count network coupled between the processing units and configured to communicate the count between the processing units. In another yet further aspect, each processing unit includes control logic configured to determine an ordering of requests based on the request indicators in the notification storage circuitry and, if any processing unit has more than one outstanding request, based on the selected priority processing unit and count stored in the multiple request count circuitry. In another aspect, each multiple request indicator includes a number of outstanding requests.

In another embodiment, in a data processing system having a plurality of processing units, wherein the plurality of processing units are interconnected with a notification network, a multiple request network, and a multiple request count network, a method includes setting a notification indicator in notification storage circuitry within each processing unit of the plurality of processing units having one or more outstanding memory coherency requests; setting a multiple request indicator in multiple request storage circuitry within each processing unit of the plurality of processing units having two or more outstanding memory coherency requests; within each processing unit, using the multiple request indicators set within the multiple storage circuitry to determine a priority processing unit among processing units having two or more outstanding memory coherency requests; and storing within each processing unit a count of a number of outstanding memory coherency requests of the priority processing unit. In one aspect, the setting the notification indicator and the setting the multiple request indicator occurs within a predetermined notification window. In a further aspect, the method further includes providing the notification indicator set within each processing unit to the notification network; and providing the multiple request indicator set within each processing unit to the multiple request network. In yet a further aspect, the predetermined notification window provides sufficient time for the set notification indicators to propagate to all processing units of the plurality of processing units by way of the notification network. In yet an even further aspect, the determining the priority processing unit is performed within each processing unit after expiration of the predetermined notification window. In another aspect of the above another embodiment, the method further includes determining, by the priority processing unit, the count of the number of outstanding memory coherency requests and providing the count to the multiple request count network. In a further aspect, the method further includes, within each processing unit, using the notification indicators set within the notification storage circuitry, the selected priority processing unit, and the count provided to the multiple request count network to determine a global ordering of the coherent memory requests from the plurality of processing units.

In yet another embodiment, a data processing system includes a plurality of processing units interconnected by a notification network, a multiple request network, and a multiple request count network. Each processing unit includes notification storage circuitry configured to store a notification indicator corresponding to each processing unit which indicates whether the processing unit has an outstanding coherent memory request; multiple request storage circuitry configured to store a multiple request indicator corresponding to each processing unit which indicates whether the processing unit has more than one outstanding request; multiple request count circuitry configured to store a count of outstanding requests corresponding to a priority processing unit; and control logic configured to select the priority processing unit from the plurality of processing units having multiple outstanding requests based on the multiple request indicators in the multiple request storage circuitry. In one aspect, the control logic in each processing unit is further configured to provide the notification indicator to the notification network, provide the multiple request indicator to the multiple request network, and if the processing unit is the priority processing unit, determine the count of outstanding requests and provide the count to the multiple request count network. In yet a further aspect, the control logic in each processing unit is further configured to determine an ordering of requests based on the notification indicators in the notification storage circuitry, the priority processing unit, and the count of outstanding requests.

What is claimed is:

1. A data processing system, comprising:
a plurality of processing units, each processing unit comprising:
notification storage circuitry configured to store a notification indicator corresponding to each processing unit which indicates whether the processing unit has an outstanding coherent memory request;
multiple request storage circuitry configured to store a multiple request indicator corresponding to each processing unit which indicates whether the processing unit has more than one outstanding request;
control logic configured to select a priority processing unit having multiple outstanding requests based on the multiple request indicators in the multiple request storage circuitry; and
multiple request count storage circuitry configured to store a count of outstanding requests corresponding to the priority processing unit;
an interconnect network coupled between the processing units and configured to broadcast coherent memory requests from a requesting processing unit of the plurality of processing units to other processing units of the plurality of processing units, a notification network coupled between the processing units and configured to communicate the notification indicator between the processing units;

a multiple request network coupled between the processing units and configured to communicate the multiple request indicator between the processing units; and a multiple request count network coupled between the processing units and configured to communicate the count between the processing units.

2. The data processing system of claim 1, wherein control circuitry within each processing unit is configured to perform a bit-wise OR of received notification indicators corresponding to a same processing unit of the plurality of processing units and, in response to the bit-wise OR, update the notification storage circuitry.

3. The data processing system of claim 2, wherein control circuitry within each processing unit is configured to perform a bit-wise OR of received multiple request indicators corresponding to a same processing unit of the plurality of processing units and, in response to the bit-wise OR, update the multiple request storage circuitry.

4. The data processing system of claim 1, wherein each notification indicator is a single bit and each multiple request indicator is a single bit.

5. The data processing system of claim 1, the control logic of each processing unit configured to determine an ordering of requests based on the notification indicators in the notification storage circuitry and, if any processing unit has more than one outstanding request, based on the selected priority processing unit and count stored in the multiple request count circuitry.

6. In a data processing system having a plurality of processing units, wherein the plurality of processing units are interconnected with a notification network, a multiple request network, and a multiple request count network, a method comprising:

setting a notification indicator in notification storage circuitry within each processing unit of the plurality of processing units having one or more outstanding memory coherency requests;

setting a multiple request indicator in multiple request storage circuitry within each processing unit of the plurality of processing units having two or more outstanding memory coherency requests;

within each processing unit, using the multiple request indicators set within the multiple storage circuitry to determine a priority processing unit among processing units having two or more outstanding memory coherency requests;

storing within each processing unit a count of a number of outstanding memory coherency requests of the priority processing unit;

determining, by the priority processing unit, the count of the number of outstanding memory coherency requests and providing the count to the multiple request count network providing the notification indicator set within each processing unit to the notification network; and providing the multiple request indicator set within each processing unit to the multiple request network.

7. The method of claim 6, wherein the setting the notification indicator and the setting the multiple request indicator occurs within a predetermined notification window.

8. The method of claim 7, wherein the predetermined notification window provides sufficient time for the set notification indicators to propagate to all processing units of the plurality of processing units by way of the notification network.

9. The method of claim 8, wherein the determining the priority processing unit is performed within each processing unit after expiration of the predetermined notification window.

10. The method of claim 6, further comprising: within each processing unit, using a same algorithm which uses the notification indicators set within the notification storage circuitry, the determined priority processing unit, and the count provided to the multiple request count network to determine a global ordering of the coherent memory requests from the plurality of processing units.

11. A data processing system comprising a plurality of processing units interconnected by a notification network, a multiple request network, and a multiple request count network, each processing unit comprising:

notification storage circuitry configured to store a notification indicator corresponding to each processing unit which indicates whether the processing unit has an outstanding coherent memory request;

multiple request storage circuitry configured to store a multiple request indicator corresponding to each processing unit which indicates whether the processing unit has more than one outstanding request;

multiple request count circuitry configured to store a count of outstanding requests corresponding to a priority processing unit; and control logic configured to select the priority processing unit from the plurality of processing units having multiple outstanding requests based on the multiple request indicators in the multiple request storage circuitry, wherein the control logic in each processing unit is further configured to:

provide the notification indicator to the notification network, provide the multiple request indicator to the multiple request network, and if the processing unit is the priority processing unit, determine the count of outstanding requests and provide the count to the multiple request count network.

12. The data processing unit of claim 11, wherein the control logic in each processing unit is further configured to apply a same algorithm to determine an ordering of requests based on the notification indicators in the notification storage circuitry, the priority processing unit, and the count of outstanding requests.

* * * * *